United States Patent
Zhang

(10) Patent No.: US 12,039,075 B2
(45) Date of Patent: Jul. 16, 2024

(54) METHODS AND SYSTEMS FOR DATA MANAGEMENT IN COMMUNICATION NETWORK

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 430 days.

(21) Appl. No.: 17/105,982

(22) Filed: Nov. 27, 2020

(65) Prior Publication Data

US 2021/0286896 A1 Sep. 16, 2021

Related U.S. Application Data

(60) Provisional application No. 62/989,447, filed on Mar. 13, 2020.

(51) Int. Cl.
*G06F 21/62* (2013.01)
*G06N 5/02* (2023.01)
(Continued)

(52) U.S. Cl.
CPC .......... *G06F 21/6245* (2013.01); *G06N 5/02* (2013.01); *H04L 67/53* (2022.05); *H04L 67/565* (2022.05)

(58) Field of Classification Search
CPC ....... H04L 67/53; H04L 67/56; H04L 67/565; G06F 21/62; G06F 21/6218; G06F 21/6245; G06N 5/02
See application file for complete search history.

(56) References Cited

U.S. PATENT DOCUMENTS

| 10,530,632 B1* | 1/2020 | Mukhopadhyaya .... H04L 43/08 |
| 11,449,797 B1* | 9/2022 | Kurniawan ............ G06N 20/00 |

(Continued)

FOREIGN PATENT DOCUMENTS

| CN | 110087237 A | 8/2019 |
| CN | 110851862 A | 2/2020 |
| WO | 2019236815 A1 | 12/2019 |

OTHER PUBLICATIONS

Huawei, Add Data Analytics Management (DAM) Module for NFMF, NSSMF and NSMF, 3GPP TSG SA WG5 (Telecom Management) Meeting #118, S5-182130, Apr. 9-13, 2018, Beijing, China revision of S5A-18xabc, 2 pages.
(Continued)

*Primary Examiner* — D'Arcy Winston Straub

(57) ABSTRACT

Methods and systems for data management in communication networks. An aspect provides a system including a first network function and a second network functions. The first network function is configured for collecting data and storing the collected data. The second network function is configured for removing private information from the collected data and producing privatized data. The first and the second network functions are separately controlled and operated by different providers. The first network function is operated by a first provider via a first controller. The second network function is operated by a second provider via a second controller. The separately controlled feature of such a network architecture enhances data privacy by ensuring different entities control the collection of data and the privatization of the collected data.

18 Claims, 7 Drawing Sheets

(51) Int. Cl.
*H04L 67/53* (2022.01)
*H04L 67/565* (2022.01)

(56) References Cited

U.S. PATENT DOCUMENTS

| | | | |
|---|---|---|---|
| 2015/0128284 A1 | 5/2015 | Lafever et al. | |
| 2017/0061311 A1* | 3/2017 | Liu | G06N 20/00 |
| 2017/0078157 A1 | 3/2017 | Zhang | |
| 2017/0078392 A1* | 3/2017 | Gray | H04L 67/02 |
| 2018/0041994 A1* | 2/2018 | Zhang | H04W 64/00 |
| 2020/0311308 A1* | 10/2020 | Arbuckle | G06F 21/6245 |

OTHER PUBLICATIONS

Huawei, Intel, Nokia, NEC, Add UC and requirements on management analytical KPI, 3GPP TSG SA WG5 (Telecom Management) Meeting #119, S5-183561, May 14-18, 2018, La Jolla (US) revision of S5A-183099, 3 pages.

* cited by examiner

| DAM customer type IDs 102 | Service Type IDs 104 |
|---|---|
| InfM (ID) | Infrastructure network load modelling and prediction (ID) |
| | Infrastructure network resource utilization modeling and prediction (ID) |
| | etc |
| CSM (ID) | Slice/service traffic load modeling and prediction (ID) |
| | Slice/service resource utilization modeling and prediction (ID) |
| | Slice/service/subscriber performance learning and prediction (ID) |
| | Slice/service application access learning (ID) |
| | etc |
| CM (ID) | Per mobile mobility learning and prediction (ID) |
| | etc |
| SONAC-Op (real-time) resource management (ID) | Per slice/service location based load modeling (ID) |
| | Per slice/service location based resource utilization learning (ID) |
| | etc |
| etc | |

FIG. 1

| DAM customer type IDs 102 | Service Type IDs 104 | AI service Performance requirement ID and corresponding performance description 506 | Privacy service Performance requirement ID and corresponding performance description 504 |
|---|---|---|---|
| InfM (ID) | Infrastructure network load modelling and prediction (ID) 514 | Level ID = 1 (accuracy, speed) Level ID = k (accuracy, speed) 516 | Level ID = 1 (perf factor) Level ID = 1 (perf factor) 518 |
|  | Infrastructure network resource utilization modeling and prediction (ID) | Level ID = 1...k (perf metric(s)) | Level ID = 1...k (perf metric(s)) |
| 512 | etc |  |  |
|  | Slice/service traffic load modeling and prediction (ID) 522 | Level ID = 1...k (perf metric(s)) | Level ID = 1...k (perf metric(s)) |
|  | Slice/service resource utilization modeling and prediction (ID) | Level ID = 1...k (perf metric(s)) | Level ID = 1...k (perf metric(s)) |
| CSM (ID) | Slice/service/subscriber performance learning and prediction (ID) | Level ID = 1...k (perf metric(s)) | Level ID = 1...k (perf metric(s)) |
|  | Slice/service application access learning (ID) | Level ID = 1...k (perf metric(s)) | Level ID = 1...k (perf metric(s)) |
| 520 | etc |  |  |
| CM (ID) | Per mobile mobility learning and prediction (ID) | Level ID = 1...k (perf metric(s)) | Level ID = 1...k (perf metric(s)) |
|  | etc |  |  |
| SONAC-Op (real-time) resource management (ID) | Per slice/service location based load modeling (ID) | Level ID = 1...k (perf metric(s)) | Level ID = 1...k (perf metric(s)) |
|  | Per slice/service location based resource utilization learning (ID) | Level ID = 1...k (perf metric(s)) | Level ID = 1...k (perf metric(s)) |
|  | etc |  |  |
| etc |  |  |  |

FIG. 5

METHODS AND SYSTEMS FOR DATA MANAGEMENT IN COMMUNICATION NETWORK

CROSS-REFERENCE TO RELATED APPLICATIONS

This application claims the benefit of priority to the United States Patent Application having Ser. No. 62/989,447 and entitled "METHODS AND SYSTEMS FOR DATA MANAGEMENT IN COMMUNICATION NETWORK" filed Mar. 13, 2020, which is hereby incorporated by reference in its entirety.

FIELD OF THE INVENTION

The present invention pertains to the field of a communication network and in particular to systems for data management.

BACKGROUND

In providing network services, network entities, including network functions or service providers, collect, use and perform a variety of operations on data, particularly operation data reported by data source providers and/or entities. In doing so, network entities also interact with one another, which may involve sharing operation data and the results of processing/operating on the operation data. Depending on the network architecture, the interaction between network entities and the use and operations performed by such network entities may vary. In some network architectures, one network entity, such as a service provider, may collect, use and perform a variety of operations on operation data reported by data source providers and/or entities. Such a network entity may collect operation data, perform analysis on the collected data, and share the results of the analyzed data with other network entities. Data source providers and/or entities, who provide operation data to the network may have limited protection or control over the network's or service providers' use and control of the operation data. Accordingly, there is a need for enhanced privacy in communication networks.

Therefore, there is a need for protecting certain kind of data in communication networks (e.g., wireless networks) that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides for a system. The system includes a first network function and a second network function that are separately controlled. The first network function configured for collecting data and storing the collected data. The second network function configured for removing private information from the collected data to produce privatized data. The system enhances data privacy and security by having each network function controlled separately, thereby preventing one function or one service provider having full access and full control over data. In some embodiments, the first network function is operated by a first provider via a first controller and the second network function is operated by a second provider via a second controller, the second provider being different from the first provider. The system further enhances data privacy by having different provider for each network function and ensuring decoupling and distributing ownership among multiple providers. In some embodiments, the second provider is a trusted source of privatized data. The system further enhances data privacy by ensuring a trusted provider as a source of privatized data. In some embodiments, the system further includes a third network function configured for receiving and analyzing the privatized data. In some embodiments, each of the first, the second and the third network function is separately controlled. In some embodiments, each of the first, second and third network function is operated by a different provider, the third network function being operated by a third provider via a third controller. The system further enhances data privacy by ensuring that the third network function controlled by a different provider than the first and the second network function to analyzed privatized data. In some embodiments, the system further includes a fourth network function configured for receiving analyzed data from the third network function and distributing the analyzed data to one or more data requesters. In some embodiments, each of the first, the second, the third and the fourth network function is separately controlled. In some embodiments, each of the first, the second, the third and the fourth network function is operated by a different provider, the fourth network function being operated by a fourth provider via fourth controller. The system further enhances data privacy by ensuring that the fourth network function controlled by a different provider than the first, the second, and the network function to distribute the analyzed data. In some embodiments, the analyzing the privatized data includes performing artificial intelligence operations in analyzing the privatized data embodiments, the system further includes a first interface, for communicating control messages, between the first controller and the second controller. In some embodiments, the first provider sends, using the first interface, an indication of data availability message to the second provider, the indication of data availability message including one or more of: a service customer type identifier (ID), a service type ID, a slice ID and database access information. In some embodiments, the system includes a second interface, for communicating control messages, between the second controller and the third controller. In some embodiments, the second provider sends, using the second interface, an indication of data availability message to the third provider, the indication of data availability message including one or more of: a service customer type ID), a service type ID, a slice ID and database access information. In some embodiments, the system further includes a third interface, for communicating control messages, between the first controller and the third controller. In some embodiments, the third provider sends, using the third interface, a data collection request message to the first provider, the data collection request message including one or more of: a start time, a stop time and a data amount. In some embodiments, the system further includes a fourth interface, for communicating control messages, between the third controller and the fourth controller. In some embodiments, the third provider sends, using the fourth interface, an indication of data availability message to the fourth provider, the indication of data availability message including one or more of: a service customer type ID, a service type ID, a slice ID and database access information. In some embodiments, the system further includes an interface for receiving a request for data from one or more data requestor. In some embodiments, the request includes one or more of: a service customer type ID, a service type ID, for each service type ID, one or more of: an artificial intelligence service performance requirement ID, a privacy service performance requirement ID, an equipment ID and a corresponding physical location. In some embodiments, the system further includes an interface between the first controller and at least one data source. In some embodiments, the at least one data source includes a mobile, an infrastructure equipment and a database. In some embodiments, the first provider sends, using the interface, sends a data collection request message to the at least one data source, the data collection request message including one or more of: a collection action ID, a data type, and a collection frequency. In some embodiments, the at least one data source sends a data collection response message to the first provider, the data collection response message including one or more of: collection action ID and a data report.

Another aspect of the disclosure provides for a system. The system includes a first network function and a second network function that are separately controlled. The first network function is configured for receiving data for analysis and providing analyzed data, and a second network function configured for receiving the analyzed data from the first network function and distributing the analyzed data to one or more data requesters. The system enhances data privacy and security by having each network function controlled separately, thereby preventing one function from having full access and full control over data. In some embodiments, the first network function receives, from a trusted source, the data in a form of privatized data in which private information of the data has been removed. In some embodiments, the first network function is operated by a first provider via a first controller and the second network function is operated by a second provider via a second controller, the second provider and the first provider are different. The system further enhances data privacy by having different provider for each network function and ensuring decoupling and distributing ownership among multiple providers. In some embodiments, the system further includes a first interface, for communicating control messages, between the first controller and the second controller. In some embodiments, the first provider sends, using the first interface, an indication of data availability message to the second provider, the indication of data availability message including one or more of: a service customer type identifier (ID), a service type (ID), a slice ID and database access information. In some embodiments, the system further includes a second interface between the first controller and a controller of the trusted source. In some embodiments, the trusted source sends, using the second interface, an indication of data availability message to the first provider, the indication of data availability message including one or more of: a service customer type identifier (ID), a service type (ID), a slice ID and database access information. In some embodiments, the system further includes a third interface for receiving a request for AI service from the one or more data requestor. In some embodiments, the request includes one or more of: a service customer type identifier (ID), a service type (ID), for each service type ID an artificial intelligence service performance requirement ID.

Another aspect of the disclosure provides for a method. The method includes collecting, by a first network function, data according to a request for service. The method further includes storing, by the first network function, the collected data. The method further includes receiving, by a second network function, the collected data. The method further includes removing, by the second network function and according to the request, private information from the collected data to produce privatized data. The method further includes receiving, by a third network function, the privatized data. The method further includes analyzing, by the third network function, the privatized data to produce analyzed data, the analyzing comprising performing artificial intelligence (AI) operations according to the request. The method further includes receiving, by a fourth network function, the analyzed data. The method further includes distributing, by the fourth network function, the analyzed data. Each of the first, the second, the third and the fourth network function is separately controlled and operated by a different provider. The method enhances data privacy by separately controlling each network function. Separation of control prevents one function or one service provider of the function from having full access and control over data. In some embodiments, the method further includes receiving, from a customer, the request including a service customer type identifier (ID) associated with the customer, a service type ID, for each service type ID, one or more of: an AI service performance requirement ID, a privacy service performance requirement ID, an equipment ID and a corresponding physical location. In some embodiments, the collected data is associated with the equipment ID. In some embodiments, the removing private information comprises removing private information according to the privacy service performance requirement ID. In some embodiments, the performing AI operations comprises performing AI operations according to the AI service performance requirement ID. The method further allows for a customized service request based on privacy and AI performance requirement.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1 is a table including a list of DAM service customers and corresponding service types in MyNET network architecture, according to an embodiment of the present invention.

FIG. 5 is a DAM configuration table which is an extension to the table in FIG. 1 including service performance requirement IDs for the AI service and the de-privacy service, according to an embodiment of the present invention.

It will be noted that throughout the appended drawings, like features are identified by like reference numerals.

DETAILED DESCRIPTION

Figure 2:
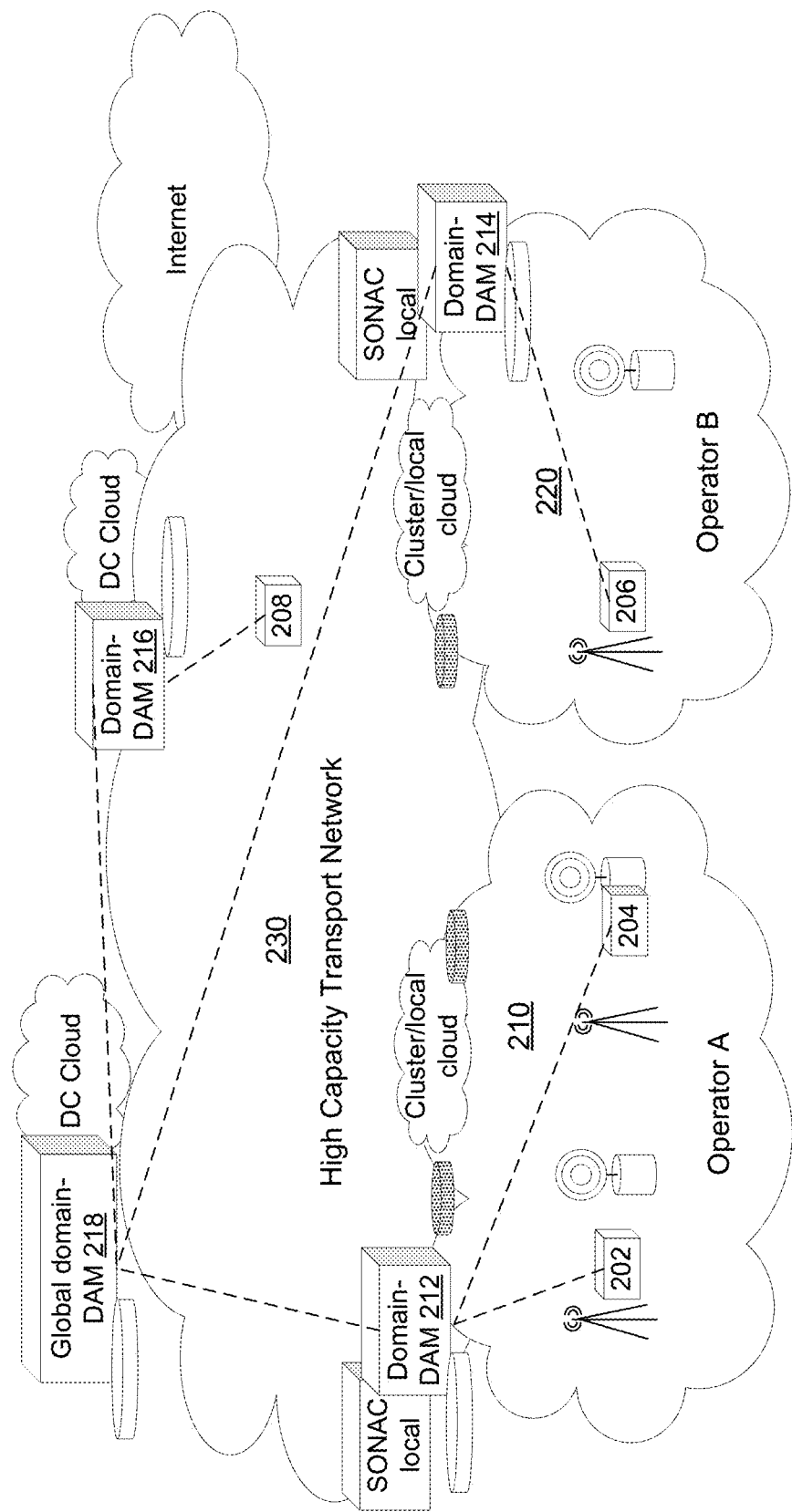
FIG. 2 is an illustration of an example DAM slice deployment, according to an embodiment of the present invention.

Protection of operation data, including data which may directly or indirectly identify data source providers and/or entities, is becoming increasingly important in communication networks. Data privacy and security concerns are important since a small number of network functions or service providers, may collect and have control or responsibility over a large amount of operation data. Having a small number of network entities controlling operation data may raise concern over the protection or privacy of operation data. Furthermore, privacy concerns are not limited to identification information about data source providers and/or entities which is collected and analyzed. Increasingly, data source providers and/or entities may be concerned about networks gathering lifestyle information, including movement and other patterns. A non limiting example of a data source provider/entity may be a user who often makes a stop at a pub while commuting from a work location to a home location may be concerned about their privacy.

However, networks have legitimate needs to gather aggregate operation data for both real time resource allocation and network planning. Accordingly, there is a need for a system which can perform a variety of data analytics for efficient network operations, while protecting the privacy of data source providers/entities. For example, data analytics can be useful in allocating sessions to slices, instantiating or modifying slices, allocating resources within a slice or a network, and other uses for the efficient operation of telecommunication networks.

As used herein, "MyNET" refers generally to architectures, methods and systems that allow (re)configurability of the network to suit the needs of various parties. "MyNET" may also be used to refer to architectures, methods and systems that allow for the automated deployment and execution of functions for establishing and operating slices.

As used herein, "SONAC" refers to Service Oriented Network Auto Creation management entities, which should be understood to be network controllers or a set of network control functions. In various embodiments, SONAC can be based on a number of technologies, and can include a Software Defined Networking (SDN) Controller (SDN-C), a Software Defined Topology (SDT) Controller, a Software Defined Resource Allocation (SDRA) controller, and a Software Defined Protocol (SDP) controller. In a given SONAC instance, some or all of SDN, SDT, SDRA and SDP may be used and controlled. One or more of these technologies, which are included in a given SONAC instance, can be controlled. In embodiments where the network makes use of virtualization, some of these SONAC functions may reside in an orchestrator. In some embodiments, a network slice can be allocated to host a SONAC controller; such a slice may be referred to as a SONAC slice. In some embodiments a SONAC slice may be a network within which a controller that can be instantiated to manage and control functions in other slices, as well as manage the creation and deletion of other slices according to at least one of customer requirement and policy. In some embodiments, SONAC can include SONAC Composition (SONAC-Com) functions and SONAC operation (SONAC-Op) functions. Generally speaking, SONAC-Com is a composition function responsible for the composition of slices and management of resources at the slice level. Accordingly, SONAC-Com can be thought of as a service orchestrator as it "orchestrates" the selection, placement and configuration of the slice components. Accordingly, the term service orchestrator may be used interchangeably with SONAC or SONAC-Com. Thus, for example the term global customer service orchestrator can be used interchangeably with the term global SONAC-Com. The Slice components include the components used for the composition and operation of a slice. For example, the slice components can include the Network Operation Support (NOS) services, operating functions and user plane functions and the network elements and links which route data between these nodes and other networks.

SONAC-Op is an operation function responsible for management of the operation of slices. For example, SONAC-Com develops slices using the general infrastructure resource pools, while SONAC-Op manages the delivery of slice traffic packets over deployed slices.

Embodiments of the present invention provide a network architecture, system and methods which enable the separation of data collection and analysis functions, such that aggregate data can be collected, used and analyzed, while protecting the privacy of data source providers/entities. In this specification, network elements include hardware configured to implement network functions which interact within a network architecture. These network elements are then configured to cooperate with each other as a system. It should be appreciated that a given network function can be implemented in a single network element or distributed across a plurality of network elements. Further any given network element can be configured to instantiate a plurality of network functions. As an example, connectivity management (CM) refers to a functionality (of managing connectivity) implemented by a CM network function or manager.

In this specification, enhanced privacy is achieved by a decoupling or separation of such functions, along with a de-privacy function for enhancing privacy. It is noted that such a de-privacy function removes private information from data and generates de-privatized data (i.e. data stripped of private information). As an example, a de-privacy function removes identification information which can identify a particular data source provider/entity. However, in some embodiments, a de-privacy function removes more than just identification information and can also remove private information about a data source provider/entity (for example, an individual user) lifestyle information, including movement and other patterns.

Privacy as discussed herein also considers the identity of a data source providers and/or entities as defined elsewhere herein. Therefore, enhancing privacy by a de-privacy function may also consider the removal or protection of information related to one or more of the following: ID of a data source entity; location of a data source entity; behavior of a data source entity, etc. Ensuring adequate privacy and/or protection of the identity of data source is important since certain techniques may be employed to derive private information, including identity of data source, even from anonymous reports, which attempts to anonymize the data source.

It should be noted that the term "de-privacy function" has the defined meaning as explained above and elsewhere herein. Alternatively, the term "privacy function" may also be used synonymously herein with "de-privacy function" to refer to the same meaning. Accordingly, the use of the term "de-privacy function" herein may be synonymous and interchangeable with using the term "privacy function".

Similar to the relationship between the terms "de-privacy function" and "privacy function" as discussed above, the terms "de-privatized data" and "privatized data" are synonymous as used herein and may be used interchangeably.

For example, in MyNET network architecture, the data analytic management (DAM) slice provides services to its customers by performing the following operations: data collection, data analysis and information extraction, and information sharing.

FIG. 1 is a table including a list of DAM service customers and corresponding service types in a network architecture, e.g., MyNET, according to an embodiment of the present invention. The DAM service customers may be associated with an identifier (ID) as shown in the "DAM Customer Type IDs" column 102. Each DAM service customer ID may be associated with and/or require one or more service type(s), each service type having a corresponding ID, as shown in "Service Type IDs" column 104.

The DAM service customers may include an infrastructure network management (InfM) manager for infrastructure network resource optimization. The InfM manager may be associated with an ID, InfM ID, as shown in the "DAM Customer Type IDs" column 102. The InfM ID may be associated with and/or require one or more service type(s) including infrastructure network load modeling and prediction, and infrastructure network resource utilization modeling and prediction. Each service type may be associated with an ID, as shown in "Service Type IDs" column 104. Accordingly, the InfM manager associated with an ID in column 102 may be a customer of (e.g, request and receive) a service of a type specified in column 104.

The DAM service customers may also include a communication customer service management (CSM) manager responsible for customer service performance, assurance, charging, and etc. The CSM manager may be associated with an ID, CSM ID, as shown in the "DAM Customer Type IDs" column 102. The CSM ID may be associated with and/or require one or more service type(s) including slice/service traffic load modeling and prediction, slice/service resource utilization modeling and prediction, slice/service/subscriber performance learning and prediction, slice/service application access learning etc. Each service type may be associated with an ID, as shown in "Service Type IDs" column 104. Accordingly, the CSM manager associated with an ID in column 102 may be a customer of (e.g, request and receive) a service of a type specified in column 104.

The DAM service customers may also include a connectivity management (CM) manager responsible for mobility analytics and prediction. The CM manager may be associated with an ID, CM ID, as shown in the "DAM Customer Type IDs" column 102. The CM ID may be associated with and/or require one or more service type(s) including per mobile mobility learning and prediction. Each service type may be associated with an ID, as shown in "Service Type IDs" column 104. Accordingly, the CM manager associated with an ID in column 102 may be a customer of (e.g, request and receive) a service of a type specified in column 104.

The DAM service customers may also include an information content forwarding management (CFM) manager responsible for media content access optimization. The CFM manager may be associated with an ID, CFM ID.

The DAM service customers may also include a service oriented virtual network creator (SONAC)-Op real-time resource manager responsible for mobile device/subscriber resource access. The SONAC-op may be associated with an ID, SONAC-Op real time resource management ID, as shown in the "DAM Customer Type IDs" column 102. The SONAC-Op ID may be associated with and/or require one or more service type(s) including per slice/service location-based load modeling, per slice/service location-based resource utilization learning, etc. Each service type may be associated with an ID, as shown in "Service Type IDs" column 104.

FIG. 2 is an illustration of an example DAM slice deployment, according to an embodiment of the present invention. Referring to FIG. 2, a DAM service slice may include local DAM function elements 202 and 204 in domain 210 associated with operator A, local DAM function element 206 in domain 220 associated with operator B, and local DAM function element 208 for domain 230, which may be a High Capacity Transport Network. The DAM service slice further includes a domain DAM function element 212 associated with domain 210, a domain DAM function element 214 associated with domain 220, and a domain DAM function element 216 associated with domain 230. The DAM service slice may further include a global DAM function element 218. In this context, in some embodiments, an operator can provide or support one or more functions of the system, either partially or fully.

The local DAM function elements in each domain are connected to the domain DAM function elements for each domain. For example, local DAM function elements 202 and 204 are connected to the domain DAM function element 212; local DAM function element 206 is connected to the domain DAM function element 214; and local DAM function element 208 is connected to the domain DAM function element 216. As shown in FIG. 2, the domain DAM function elements 212, 214, and 216 are connected to the global DAM function element 218.

The DAM slice of FIG. 2 may be controlled and operated by one service provider, which may perform the following operations: data collection of network operation data; data analytics (such as artificial intelligence (AI)) for providing data information, including data modeling and prediction and so on; and information data sharing for delivering/sharing data of before and/or after AI processing to DAM service customers or third parties.

Having one service provider performing several data operations gives substantial control and power over operation data. Such control over operation data may raise concern over protection of and/or the privacy of data. In order to enhance privacy and/or protection of operation data, embodiments described herein provide for a more trustable mechanism in dealing with operation data.

For example, in the case of MyNET network architecture, embodiments described herein provide for a better operation data protection and privacy protection of mobiles/equipment that send data to the DAM. Embodiments discussed herein provide for an extension of the DAM service architecture as further described below.

In order to better protect all types of network operation data, e.g., data required for the various service types in the "Service Type IDs" column 104, embodiments provide for a systematic classification of DAM service functions.

Embodiments further provide for a function which may called a de-privacy function. In this specification, the term de-privacy function refers to one or more network elements configured to perform de-privacy functionality. The de-privacy functionality includes as a subset, the de-identification, which may be described as the process or technique for removing personal or private information from data. The de-privacy functionality may also include as a subset, the process or technique of de-privatizing data, which may be similar to de-identification of data. As stated, however, in some embodiments, the de-privacy functionality removes more than just identification information and can also remove private information related to a data source provider/entity, for example, an individual user's lifestyle information, including movement and other patterns. Accordingly, in this specification the term de-privatized data is used to indicate private information has been removed from the data. In some embodiments, the de-privatized data has had identification information removed. In other embodiments, de-privatized data has had identification and other private information removed. Accordingly, the de-privacy function is configured for removing private information from collected data to produce and supply de-privatized data for analysis Accordingly, embodiments provide for a decoupling of DAM functions (services), including the newly introduced de-privacy functions. Embodiments further provide for the distribution of responsibility and ownerships of DAM services to multiple players (providers). Embodiments further provide for a DAM service consortium and its associated controllers, as further defined herein. Embodiments further provide for defining the responsibility of each provider and actions of the controller. Embodiments further provide for interfaces between DAM service customers and DAM service consortium controllers. Embodiments further provide for interfaces among controllers of the DAM service consortium.

Accordingly, an aspect of the disclosure provides for methods, systems, and network architectures which utilize these de-coupled functions in such a manner that the de-coupled functions are separately controlled. In some embodiments, these de-coupled functions are operated by different entities to enhance privacy to ensure no single entity collects too much private information about a single data source provider/entity of the network. For example, a network architecture can include a first network function for collecting data and storing the collected data; and a second network function for removing private information from collected data to produce and supply de-privatized data for analysis. The first and second network functions are separately controlled. In some embodiments the second network function is operated by a second provider, the second provider being different from the provider of the first network function. In some embodiments, the second provider is a trusted source of de-privatized data.

Further embodiments also include a separate third function for receiving and analyzing the de-privatized data. Further embodiments also include a fourth network function for receiving the analyzed data from the third network function and distributing the analyzed data to requesters. In some embodiments, each of the first, second, third and fourth network functions are separately controlled. In some embodiments each of the first, second, third and fourth network functions are operated by different providers.

In some embodiments the third network function utilizes artificial intelligence in providing data analyzing the de-privatized data.

Embodiments further provide for managing, by multiple and different players, the classified functions of DAM service functions and the de-privacy function, provided that the players have established or have a mechanism for establishing a certain level of trust and/or confidence among them. In this context, the term players, which is used interchangeable with providers herein, refers to legal entities that have operating control over the network functions responsible for collecting, enhancing privacy via the de-privacy function, analyzing and distributing data.

According to embodiments, the DAM services are distributed among multiple players which enable very flexible and configurable network architecture for network operation data collection, analytics and usage, in addition to the key feature of privacy protection.

Embodiments will now define DAM functions and describe the distribution and ownership of DAM functions among multiple players.

As discussed elsewhere herein, the de-privacy function may be added as a service to DAM functions forming the DAM service family. In networks, e.g., 6G networks, optimization of network operations require access to network operation data, which may be obtained from infrastructure network elements, and also data from mobiles, devices, and etc. Accordingly, appropriate privacy protection including operation data protection is a key requirement optimizing network operations. In this specification, examples will be given for wireless networks, but it should be appreciated that the principles discussed herein are applicable to communication networks generally.

To enhance privacy, DAM functions may be classified into several types of functions. The classified functions may include controlled data collection functions which collect network operation data from data sources, providers and/or entities. The data collection would be subject to having established a certain level of trust and/or confidence among the different players performing the classified functions.

Data sources, providers and/or entities may include a variety of wireless entities and a variety of infrastructure network entities. Wireless entities may include mobiles, devices, vehicles, sensor, etc. Infrastructure entities may include wireless network access nodes, IP routers, DCs, cloud, virtual network functions, etc.

Network operation data, which may be sent by mobiles may include information relating to one or more of: observed top N signal-to-noise (SNR) values of network nodes; time advance for uplink synchronization with serving network node; observed SNR values of other devices, etc. The observed top N SNR values of network nodes refers to the monitoring of surrounding network nodes by evaluating SNRs.

Network operation data, which may also be sent by equipment entities may include information relating to one or more of: number of packets processed in a certain time (e.g. minute); packet delay data; resource used; power consumed, etc.

As discussed elsewhere herein, enhancing privacy, therefore, also consider the removal or protection of information related to one or more of the following: ID of a data source entity; location of a data source entity; behavior of a data source entity, etc. Ensuring adequate privacy and/or protection of the identity of data source is important since certain techniques may be employed to derive private information, including identity of data source, even from anonymous reports, which attempts to anonymize the data source.

The classified functions may further include de-privacy functions which perform de-privacy operations on collected data. Different de-privacy algorithms provide different de-privacy performance, e.g., de-privacy level. The performance requirement for a de-privacy operation may be indicated by the DAM service customer requesting the service.

For example, there are different de-privacy schemes which can provide different performance, but at different costs. Accordingly a controller for a de-privacy provider can select a suitable scheme (algorithm) to meet a required or desired performance requirement.

The classified functions may further include AI for NETwork operation optimization (AI4NET) functions which process data having been processed by de-privacy functions, i.e. after-de-privacy data, for network performance optimization purposes. Different AI algorithm may be used to provide different performance, e.g., accuracy of modeling prediction and analysis convergence speed, etc. The performance requirement for an AI operation may be indicated to AI4NET functions by the DAM service customer requesting the service.

The classified functions may further include information data access/delivery functions which perform distribution of data having been processed by the AI4NET functions, i.e. after-AI-data, to authorized DAM service customers.

Having classified DAM functions, the responsibility and ownership of DAM services (i.e. functions) may be distributed among multiple players or providers. Distributing the responsibility and ownership of DAM functions among multiple players reduces the security and privacy risks associated with having one provider managing all DAM functions. Accordingly, embodiments provide for multiple players (providers) jointly managing the DAM functions and services.

The different players or providers managing the DAM functions may include: a controlled data collection service provider who provides controlled data collection functions; a de-privacy provider who provides de-privacy functions; an AI4NET service provider which provides AI4NET functions; and an information data access/delivery service provider which provides information data access/delivery functions.

The different multiple providers managing DAM functions may form a DAM service consortium to provide DAM services jointly to DAM service customers. Each provider may have a corresponding controller to control the operation of the provider's functions. The providers may define their corresponding controllers. The consortium comprising of multiple providers include controlled data collection service providers, de-privacy service providers, AI4NET (or AI) service providers, and information data access/delivery service providers.

By classifying the functions of the DAM and distributing the ownership of the classified functions among multiple players, a flexible DAM architecture may be provided. Although embodiments described herein refer to a DAM, it should be noted that a person skilled in the art may apply the same approach of decoupling the functions of a network entity and distributing the functions among multiple players to form a consortium to enhance privacy of operation data. The consortium may also provide the de-privacy functions as discussed herein.

Figure 3:
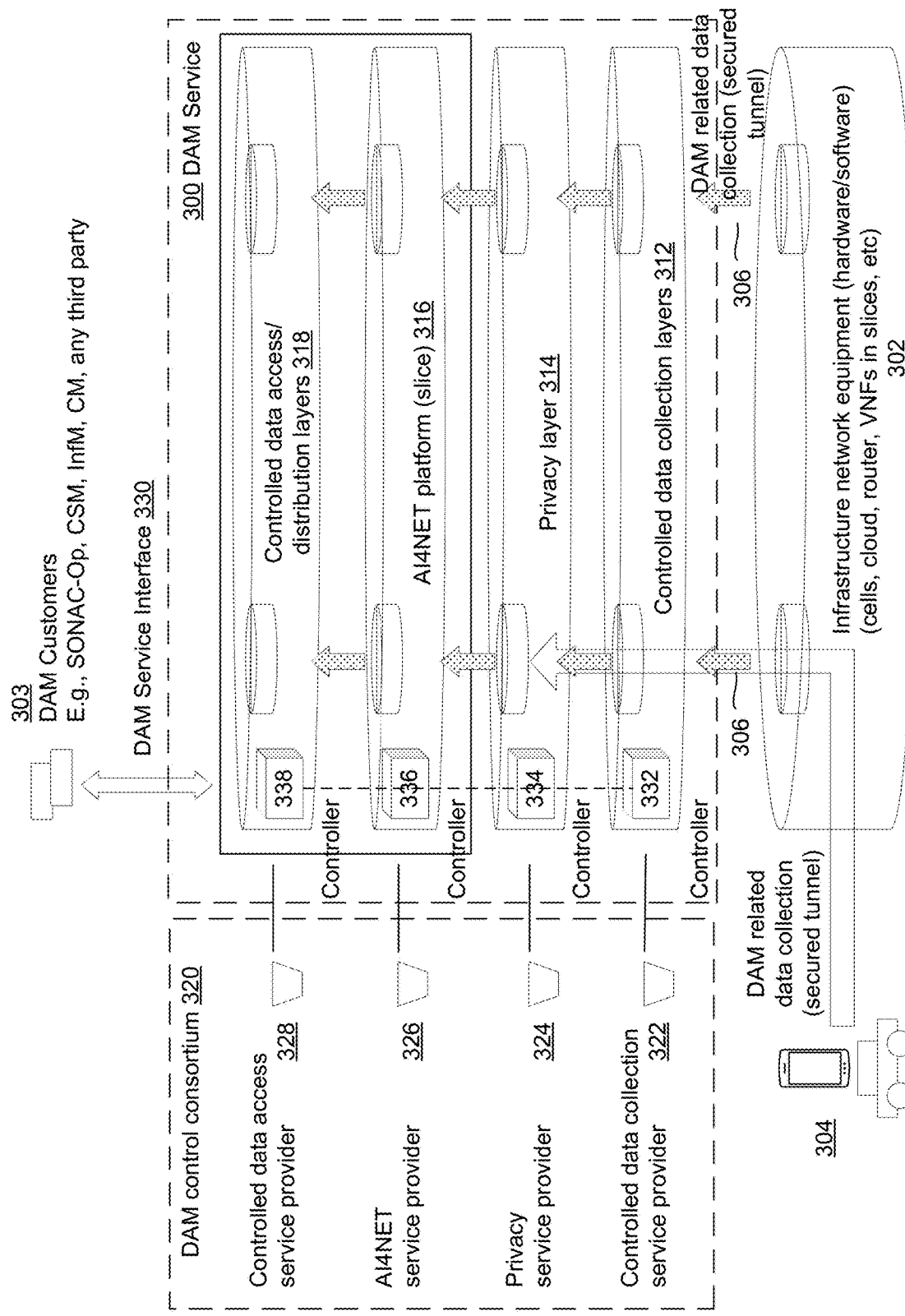
FIG. 3 illustrates a DAM service architecture comprising a consortium of providers, each providing a separate DAM service, according to an embodiment of the present invention.

FIG. 3 illustrates a DAM service architecture comprising a consortium of providers, each providing a separate DAM service, according to an embodiment of the present invention. Referring to FIG. 3, the DAM service 300 may comprise multiple layers including controlled data collection layers 312, de-privacy layers 314, AI4NET platform (slice) 316 and controlled data access/distribution layers 318. The DAM service 300 may collect data, through a secured tunnel 306, from mobiles 304 and infrastructure network equipment/elements 302, including wireless cells, cloud, routers, virtual network functions (VNFs), etc. The DAM service 300 collects DAM related data at the controlled data collection layers 312. Mobiles devices 304 may send DAM related data to the controlled data collection layers 312 through secured tunnel 306. Mobile devices 304 may also send DAM related data to de-privacy layer 314 using the secured tunnel 306.

The DAM service/control consortium 320 may comprise a controlled data collection service provider 322, a de-privacy service provider 324, an AI4NET service provider 326 and a controlled data access service provider 328. The DAM control consortium may interact with DAM service customers including third parties through the DAM service interface 330.

The controlled data collection service provider 322 controls and operates the data collection layer 312 using the controller 332, being the controlled data collection service controller. In other words, the controlled data collection service controller 332 controls the data collection from mobiles 304 and infrastructure network elements 302.

In order for the controlled data collection service provider 322 to determine what data to collect, including from where to collect data, the DAM customer 303 may provide the information required for the controlled data collection service provider 322 to determine what data to collect through the DAM service interface 330. The DAM customer 303 may include the required information in a request to the DAM service 300, which the request may be received by the controlled data collection service provider 322 via the controller 332. The controlled data collection service provider 322 may forward the collected data to the de-privacy layer 314 through the secured tunnel 306 (data plane). Examples of the DAM customers 303 include a CSM manager, and InfM manager, a CM manager, etc.

The de-privacy service provider 324 controls and operates the de-privacy layer 314 using the controller 334, being the de-privacy service controller. Accordingly, the de-privacy provider 324 performs the de-privacy operations. The de-privacy service provider 324 may communicate control messages with the controlled data collection service provider 322 through a controller interface connecting their controllers 334 and 332 respectively. This controller interface may be used for indication of data availability. It should be noted that the performance requirement for the de-privacy service may vary from one mobile or another, such that some mobile would require a higher-level de-privacy performance requirement than other mobiles. Having performed the de-privacy operations, the de-privacy service provider 324 sends the after-de-privacy processed data to the AI4NET platform 316 through the secured tunnel 306.

The AI4NET service provider 326 controls and operates the AI4NET platform (slice) 316 using the controller 336, being the AI4NET service controller. Accordingly, the AI4NET service provider 326 performs the AI operations. The required performance of the AI operations may be provided by the DAM service customer 303 through the DAM service interface 330. The AI4NET service provider 326 may communicate control messages with the de-privacy service provider 324 through a controller interface connecting their controllers 336 and 334 respectively. This controller interface may be used for indication of data availability. Having performed the AI operations, the AI processed data or after AI process data may be sent to the controlled data access/distribution layer 318 through the secured tunnel 306.

The controlled data access service provider 328 controls and operates the controlled data access/distribution layers 318, using the controller 338, being the data access/distribution controller. Accordingly, the controlled data access service provider 328 performs the data access/distribution operations. The controlled data access service provider 328 may communicate control messages with the AI4NET service provider 326 through a controller interface connecting their controllers 338 and 336 respectively. This interface is used for indication of data availability.

The DAM architecture illustrated in FIG. 3, is one example of DAM implementation, which provides a complete DAM service operation procedure from data collection to information data delivery, as described herein. Accordingly, there may be other potential DAM architecture options that may be employed by a person skilled in the art, for example, provisioning of DAM service 300 to third parties as further described herein.

Referring to FIG. 3, although the de-privacy operations performed by the de-privacy service provider are described in the context of the DAM service 300, it should be noted that the de-privacy operations may be performed for any type of de-privacy customers, in addition to the service being part of the DAM service 300. The de-privacy operations may be performed for any type of de-privacy customers because the service is performed by a dedicated de-privacy provider which can also provide the service to third parties. In other words, the de-privacy service may be dedicated to data collected from mobile 304 and/or from infrastructure network equipment/elements 302, as discussed in reference to FIG. 3. The de-privacy service may also be provisioned as a service feature to third parties which may provide the data that require the de-privacy service.

Similarly, the AI operations performed by the AI4NET service provider 326 may be performed on any data provided to the AI4NET service provider and is not limited to data received from the de-privacy layer 314. The AI operations may be performed for any type of AI4NET customers because the service is performed by a dedicated AI4NET provider which can also provide the service to third parties.

Figure 4:
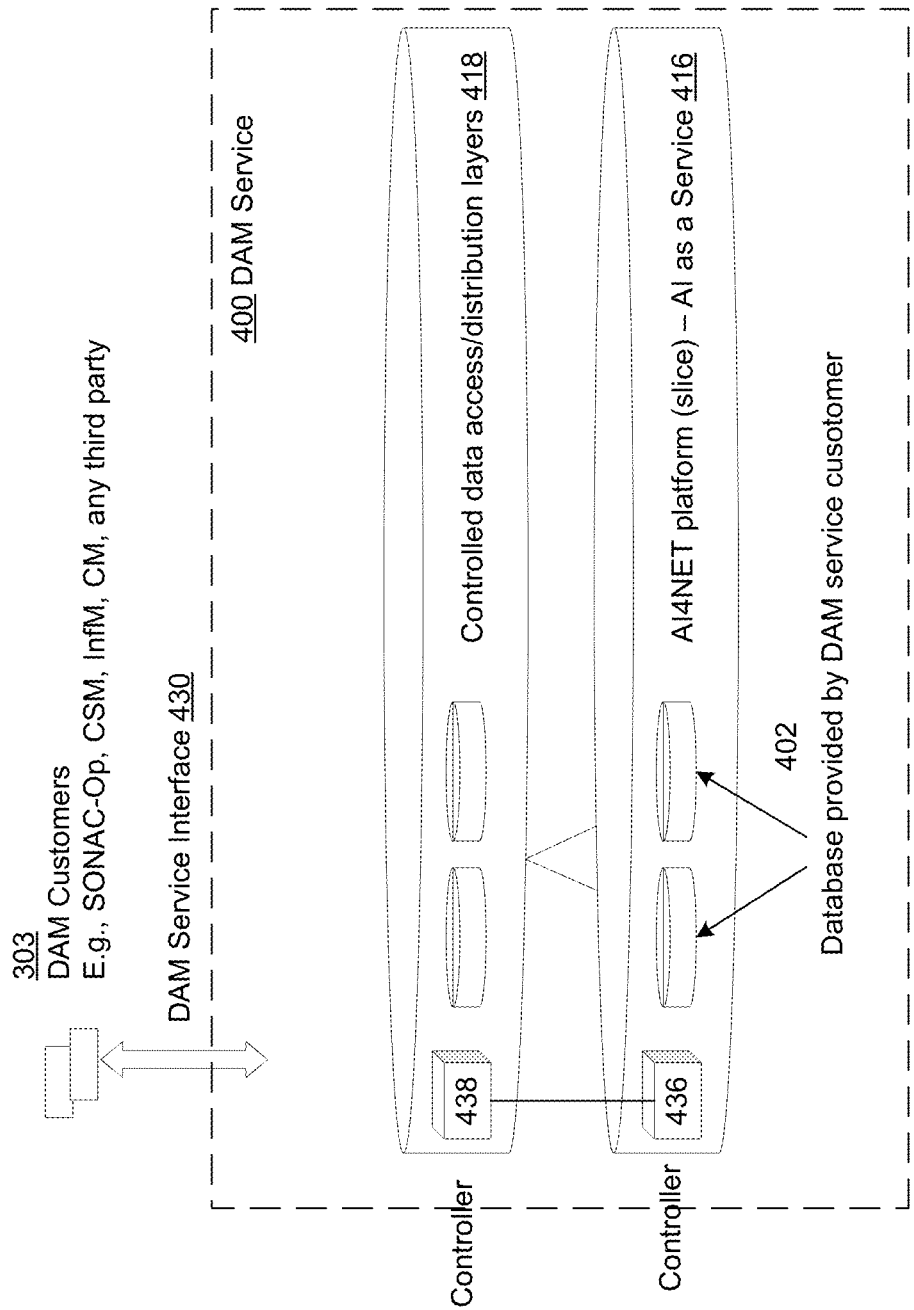
FIG. 4 illustrates another DAM service architecture with AI as a service, according to an embodiment of the present invention.

FIG. 4 illustrates another DAM service architecture with AI as a service, according to an embodiment of the present invention.

Referring to FIG. 4, the DAM service 400 may include an AI4NET platform (slice) 416 and controlled data access/distribution layers 418. The controlled data access/distribution layers 418, including controller 438, may be similar to the controlled data access/distribution layers 318 of FIG. 3. Similarly, the an AI4NET platform (slice) 416 may be similar to the an AI4NET platform (slice) 316 of FIG. 3. A provider similar to the AI4NET service provider 326 of FIG. 3 may control and operate the AI4NET platform (slice) 416 using the controller 436, being the AI4NET service controller of DAM service 400.

In the DAM architecture of FIG. 4, the AI operations (AI service), may be performed on data 402 provided by AI4NET customers, without using data collected by DAM service. Accordingly, the AI4NET service designed for DAM service 400 may be openly used by any third party that may require AI operations. Although, it should be noted that mutual authentication and authorization need to be established before any data collection action is performed or data provided.

As described in embodiments herein, the decoupling of DAM functions approach and provisioning of the decoupled (classified) functions by independent providers permit the provisioning of the decoupled functions as a service to any third parties. Accordingly, the responsibility of each provider is defined based on the functions or operations it performs. The providers may exchange control messages among themselves through their respective controllers' interfaces. The providers may further communicate with and provide their services to third parties though the DAM service interface 330 or 430. Accordingly, embodiment provide services including de-privacy as a service, data collection as a service, AI4NET as a service and data access/delivery as a service.

The DAM function decoupling approach discussed in embodiments herein enables the provisioning of AI4NET as a service and de-privacy as a service. According to embodiments, services such as AI4NET and de-privacy are performed by different providers, which enhances data privacy by reducing risks associated with having one provider managing all DAM functions, having control over and access to all data provided for DAM purposes. By decoupling the DAM functions and distributing ownership of such functions among multiple different players forming a consortium for providing DAM services, data privacy is enhanced. Further having such a consortium provides for availability of the DAM functionalities provided to third parties, whether as part of DAM services or as separate services, as discussed herein.

Embodiments will now describe the indication and/or acquisition of performance requirement for AI and de-privacy services/operations.

As discussed, the AI4NET and de-privacy services may be performed at a varying level of performance as may be indicated and/or required by a customer for such services. Accordingly, a customer may indicate the required level of performance for each of the AI4NET and de-privacy services to the individual providers of the AI4NET and de-privacy services to determine the required algorithm for performing their respective operations. Embodiments provide for a two-step performance requirement indication scheme/procedure for customers to use in indicating the service performance requirement to the providers.

FIG. 5 is a DAM configuration table which is an extension to the table in FIG. 1 including service performance requirement IDs for the AI service and the de-privacy service, according to an embodiment of the present invention.

Referring to FIG. 5, the table includes the table of FIG. 1 and extends the table to columns 506 and 504.

For each service type in column 104, column 506 provides a predefined associated AI service performance requirement ID and a corresponding performance description as a list of indices. Similarly, for each service type in column 104, column 504 provides a pre-defined associated de-privacy service performance requirement ID and a corresponding performance description as a list of indices. As discussed with reference to FIG. 1, each DAM customer type in column 102 may be associated with one or more services types listed in column 104. The DAM customer, as listed in the "DAM customer type ID" column 102, include InfM manages, CSM-QoS managers, CM managers, SONAC-Op controllers, and etc.

The performance requirement ID of columns 504 and 506 associated with each service type ID of the DAM customers may be preconfigured in the controllers 334 and 336 of their respective service providers. For example, the AI4NET service controllers 336 and 436 may be preconfigured with the AI service performance requirement ID and the corresponding performance description of column 506 for each of the service types of the DAM customers. Similarly, the de-privacy controller 334 may be preconfigured with the de-privacy service performance requirement ID and the corresponding performance description of column 504 for each of the service types of the DAM customers. Accordingly, when a DAM customer or a third party requests a service from a service provider, whether the AI4NET service provider 326 or the de-privacy service provider 324, the DAM customer or the third party may indicate, in the request, the performance requirement of the service, whether an AI service or a de-privacy service, by including the list of indices for the AI and/or de-privacy service performance requirement ID and corresponding performance description.

Upon receiving the service performance requirement ID and the corresponding performance description from the DAM customer or the third party, the service provider, for example, the AI4NET service provider 326 or the de-privacy service provider 324, may perform the requested service according to the provided performance requirement. For example, the request for service may be from an ID 512 associated with an InfM manager, requesting a service type ID 514, associated with the service for infrastructure network load modeling and prediction. The request may indicate an AI service performance requirement ID 516, which may be a level ID between 1 and k. The level ID may indicate one or more performance metrics for the AI service requested, for example, accuracy and speed. Accuracy metric may refer to the accuracy of e.g., prediction accuracy and metrics, and speed metric may refer to the speed of AI algorithm to be performed for the requested AI service.

The request from the DAM customer, e.g. InfM manager with ID 512, may further indicate a de-privacy service requirement ID 518, which may be a level ID between 1 and k. The level ID may indicate one or more performance metrics for the level of de-privacy service requested, for example, a percentage (i.e. 99%) of privacy information that may need to be removed. It should be noted that other performance metrics may also be used depending on the nature of the service type requested and the customer making the request. The table of FIG. 5, including the list of indices indicated the service performance requirement ID and their corresponding performance metrics may be pre-distributed among DAM players/providers.

Embodiments will now describe the acquisition of AI service performance requirement by AI4NET service provider (or controller) for providing an AI4NET service. Embodiments provide for a two-step procedure for an AI4NET service controller 336 or 436 to determine the performance requirement of a request for an AI service. At step one, a DAM configuration table, for example, the table of FIG. 5, may be defined and distributed to the AI4NET service controller 336 or 436. At step two, when a DAM customer requests a service type, for example the service types in column 104, the customer may indicate the AI service performance requirement by sending a DAM service request message. The message may include a DAM service customer type ID (referring to column 102), a service type ID (refer to column 104) and an AI service performance requirement ID (refer to the column 506). Based on the service request message received, the AI4NET service controller 336 or 436 may determine the corresponding AI algorithm required to perform the requested service.

Embodiments will now describe the acquisition of de-privacy service performance requirement by de-privacy service provider (or controller) for providing an AI4NET service. To provide the required de-privacy service to customers, the de-privacy provider 324 requires the performance requirement for the de-privacy service. The customer service management (CSM) may be an entity that determines the de-privacy performance requirement and indicates the requirement to de-privacy service provider 324. The CSM is designed and responsible for satisfying the interests or maintaining the quality of service for communication customers/subscribers having been accepted by wireless networks.

Embodiments provide for a two-step procedure for a de-privacy service controller 326 to determine the performance requirement of a request for a de-privacy service. At step one, a DAM configuration table, for example, the table of FIG. 5, may be defined and distributed to the de-privacy service controller 324. At step two, upon the establishment of a service slice and/or the acceptance of a customer service, the CSM-QoS may determine the de-privacy service performance level. Upon such determination, the determined de-privacy service performance level is sent to the de-privacy controller using the DAM-de-privacy configuration message. The configuration message may include a DAM service customer type ID (referring to column 102, for example, CSM-QOS customer ID 520), a service type ID (refer to column 104) and a de-privacy service performance requirement ID (refer to the column 504). Based on the configuration message received, the de-privacy service controller 324 may determine the corresponding performance level to perform the requested service.

It should be noted that any third party may, similarly, as described herein, request a service of defined performance requirement, from the service providers, for example AI4NET service provider 326 and/or de-privacy service provider 324, by providing/indicating the performance requirement ID. The performance requirement ID may be defined by performance metrics as deem appropriate and communicated to the controllers of the service providers.

The embodiments related to the two-step approach of acquiring performance requirement of a requested service provide for a simplified signaling design and reduces the signaling overhead. The signaling is further simplified and reduced by using DAM configuration table as described in embodiments herein.

Embodiments will now discuss the responsibilities and actions of DAM service consortium 320 members, including controlled data collection service provider 322, de-privacy service provider 324, AI4NET service provider 326, and controlled data access service provider 328.

The controlled data collection service provider 322 may be responsible for establishing mutual authentication and authorization with data source providers and/or entities, before any data collection action is performed. These data source provider and/or entities may include mobiles, devices 302 and infrastructure network equipment/elements 304. The controlled data collection service provider 322 may further be responsible for the collection of data. The controlled data collection service provider 322 may collect data over an air interface from a variety of wireless entities, such as, mobiles, vehicles, sensors, etc. The controlled data collection service provider 322 may further collect data from a variety of infrastructure network entities, such as wireless network access nodes, IP routers, DCs, cloud, virtual network functions, etc.

The controlled data collection service provider 322 may further be responsible for acquisition of knowledge of entity location from where data is collected. Where the data collection is for one particular slice, then the topology of the slice and corresponding slice ID (slice information) should be indicated to the collection service provider upon the creation of the slice, as discussed herein. The slice information may also be provided by a DAM service customer upon a request for service by the customer using DAM service request message. Accordingly, the request message may include information such as slice ID, and topology, i.e., locations of network functions.

For other types of data collection other than what is described herein, the requester may indicate in the request the location and the required information of the infrastructure equipment/element from which the collection service provider 322 is to collect data.

The controlled data collection service provider 322 may further be responsible for the acquisition of knowledge of types of data which need to be collected. Based on the DAM configuration Table, for example table in FIG. 5, and index indication (referring to the ID included, such as a service type ID) in DAM service request message, the controller 322 may determine the data types which need to be collected. For example, the CSM-QoS may request the data collection service provider 322 for slice/service traffic load modeling and prediction by including the service type ID 522 in the request. The data collection service controller 332 may determine, based on the service type ID 522, that data for the load related to a particular slice need to be collected.

The controlled data collection service provider 322 may further be responsible for the acquisition of knowledge of frequency of data collection. The service provider may similarly determine the required frequency of data collection though the DAM service request message sent by the requester. The request message may indicate, for example, that the data collection should be performed for a period of time (time window) or continuously.

The controlled data collection service provider 322 may further be responsible for the management of database(s) by organizing the collected data in the database(s). The controlled data collection service provider 322 may further be responsible for determining the reusability of data. The data collection service controller 3332 may keep a record of the collected/used data used and may determine/check whether the recorded data may be reused for other purposes.

The controlled data collection service provider 322 may further be responsible for interacting with the de-privacy service provider 324 regarding availability of data, through their respective controllers 332 and 334. The data collection servicer controller 332 provides indications of data availability to the de-privacy service controller 334.

The controlled data collection service provider 322 may further be responsible for sharing data with other registered service providers other than de-privacy service providers, for example AI4NET service provider 326, controlled data access service provider 328, or other third parties.

The de-privacy service provider 324 may be responsible for acquiring, through its controller 334, the service performance requirement as discussed elsewhere herein. The de-privacy service provider 324 may further be responsible for acquiring, through its controller 334, the types of data, based on the service type requested, for performing de-privacy operations. The types of data to be acquired may be determined by the controller 334 through the DAM service request message as discussed elsewhere herein. The de-privacy service provider 324 may determine, through its controller 334, the de-privacy algorithm required to perform the data de-privacy operations based on the associated performance requirement ID that may be sent from the service requester.

The de-privacy service provider 324 may further be responsible for establishing a secured tunnel 306 between mobiles/devices in data plane. The purpose of this tunnel establishment may be to hide the plain data from the controlled data collection service providers 322. The de-privacy service provider 324 may further interact with the controlled data collection service provider 322 through their respective controllers 334 and 332 to obtain indication of data availability for de-privacy operations.

The de-privacy service provider 324 may further be responsible, through its controller 334, to organize the data that has been undergone de-privacy operations. The de-privacy service provider 324 may further interact with the AI4NET service provider 326 through their respective controllers 334 and 336. The controller 334 and 336 may communicate with each other regarding the data availability for AI operation using indication of data availability message.

The AI4NET service provider 326 may be responsible for acquiring, through its controller 336, the AI service requirements as discussed elsewhere herein. The AI4NET service provider 326 may further be responsible for performing data analytics, including AI operations. The AI4NET service provider 326 may further be responsible for interacting with the controlled data collection service provider through their respective controllers 336 and 332 using data collection request message. The AI4NET service provider 326 may further be responsible, through its controller 336, for organizing information data in database(s). The AI4NET service provider 326 may further be responsible, through its controller 336, to control the reusability of data by monitoring/checking the reusability of available information data. In some cases, the results of AI-processed data may further be used for further AI operations. The AI4NET service provider 326 may further interact with the controlled information access/delivery service provider 328, vie their respective controllers 336 and 338. The interaction via the controllers may be for communicating the indication of information data availability by using indication of information data availability message. The indication of information data availability message may include customer ID of the set of information data and the database location.

The controlled information data access/delivery service provider 328 may be responsible for controlled access/delivery of information database. Prior to any access/delivery of data, the controlled information data access/delivery service controller 338 needs to have authorization and authentication establishment between information database and DAM customer functions/database. The controlled information data access/delivery service provider 328 may further be responsible for interacting with the AI4NET service provider 326, through their respective controllers 338 and 336. The controlled information data access/delivery service controller 338 may interact with the AI4NET service controller 336 for receiving indication of information data availability message from the AI4NET service controller 336. The controlled information data access/delivery service provider 328 may further be responsible for interacting, via its controller 338, with the DAM customer. In response to a request from the DAM customer for access/delivery of data, the controlled information data access/delivery service provider 328 may send, through its controller 338, a DAM service response message to indicate the database location. The controlled information data access/delivery service provider 328 may further be responsible for performing data transfer operations, for example, transfer of data from a database to a database assigned by the DAM customer. The controlled information data access/delivery service provider 328 may further be response for sharing data with other registered providers other than DAM service customers, or a third party.

The defined responsibilities and actions of the service providers as described herein provide for a controlled operation of the providers in providing joint and independent DAM services.

Figure 6:
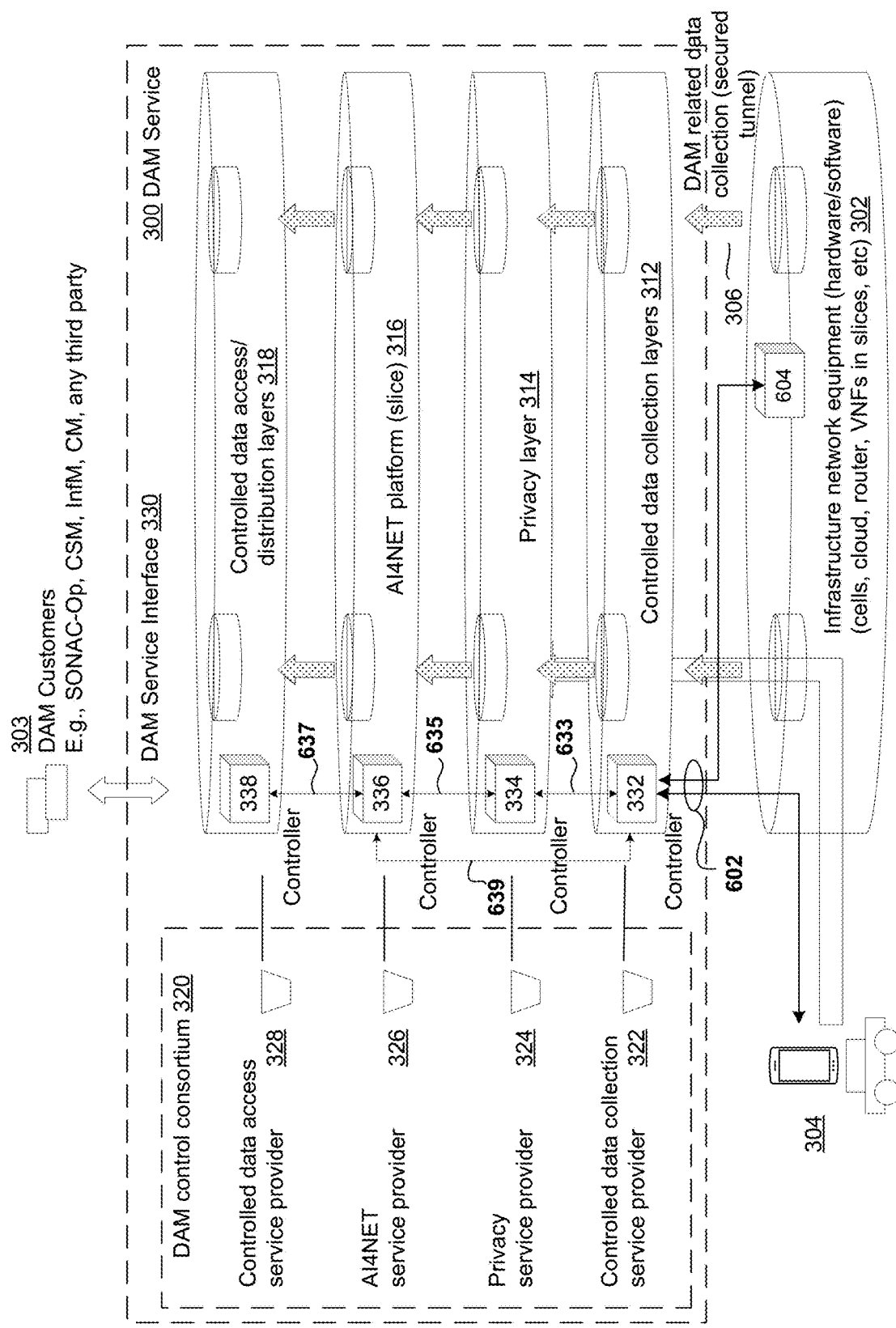
FIG. 6 illustrates an interface design of the DAM service architecture of FIG. 3, according to an embodiment of the present invention.

FIG. 6 illustrates an interface design of the DAM service architecture of FIG. 3, according to an embodiment of the present invention. Referring to FIG. 6, the interface design may include three interface families, the DAM service interface 330, the interface between consortium (service providers) controllers, and an interface 602 between the DAM service consortium 320 and data sources including equipment/elements 604 and mobiles 304.

The DAM service interface 330 may provide information exchange between DAM service customers 303 and controllers of DAM service consortium, 332, 334, 336, and 338. The DAM service interface 330 enables DAM service customer 303 to send DAM service request message to DAM service consortium 320 and enable DAM service consortium 320 to send DAM service response message to DAM service customers 303.

The DAM service request message may include one or more of: a DAM service customer type ID; a DAM service type ID(s); for each of service types, an AI service performance requirement IDs; for each of service types, a de-privacy service performance requirement IDs; for each of service types, a list of equipment/element ID and corresponding physical location; and slice ID.

The DAM service response message may include one or more of: a DAM service customer type ID; a DAM service type ID(s); a slice ID; a database access information, etc.

The interfaces between DAM service consortium controllers may include an interface 633 between controlled data collection service controller 332 and de-privacy service controller 334. The controlled data collection service provider 322 may send an indication of data availability message, via the interface 633, to the de-privacy service provider 324, using their respective controllers 332 and 334. The indication of data availability message may include one or more of: a DAM service customer type ID, a DAM service type ID(s), a slice ID, a database access information, etc.

The interfaces between DAM service consortium controllers may include an interface 635 between the de-privacy service controller 334 and the AI4NET service controller 336. The de-privacy service provider 324 may send an indication of data availability message, via the interface 635, to the AI4NET service provider 326, using their respective controllers 334 and 336. The indication of data availability message may include one or more of: a DAM service customer type ID, a DAM service type ID(s), a slice ID, a database access information, etc.

The interfaces between DAM service consortium controllers may include an interface 637 between the AI4NET service controller 336 and the controlled data access service controller 338. The AI4NET service provider 326 may send an indication of data availability message, via the interface 637, to the controlled data access service provider 328, using their respective controllers 336 and 338. The indication of data availability message may include one or more of: a DAM service customer type ID, a DAM service type ID(s), a slice ID, a database access information, etc.

The interfaces between DAM service consortium controllers may include an interface 639 between the AI4NET service controller 336 and the controlled data collection service controller 332. The AI4NET service provider 326 may send a data collection request message, via the interface 639, to the controlled data collection service provider 322, using their respective controllers 336 and 332. The data collection request message may include one or more of: a time to start collection; a time to stop data collection; collection data amount; etc. The data collection service controller 332 may use the information included in the data collection request message to control the data collection operation. For example, the controlled data collection service controller 332 may start data collection at the time indicated by "Time to start collection"; and stop data collection based indication of "Time to stop data collection" or stop data collection when the data amount reaches the amount indicated by "Collection data amount".

The interface 602 between the DAM service consortium 320 and data sources including equipment/elements 604 and mobiles 304 may be used by controller 332 of the controlled data collection service provider 322 to send a data collection request message to entities including equipment/elements 604 mobiles 304. The data collection request message may include one or more of: collection action ID; data types; collection frequency (reporting interval); etc. The data type for mobile/device 304 may refer to network operation data sent by mobiles and devices and discussed herein, for example, information relating to one or more of: observed top N SNR values of network nodes; time advance for uplink synchronization with serving network node; observed SNR values of other devices, etc. The data types for infrastructure network equipment/elements 302 may refer to types of data associated with MyNET, for example network operation data sent by infrastructure equipment, including one or more of: number of packets processed in a certain time (e.g. minute); packet delay data; resource used; power consumed; etc.

In response to the data collection request message, the mobiles 304 and equipment/elements 604 send a data collection response message to the controller 332 of the data collection services provider 322 using the interface 602. The data collection response message may include one or more of: collection action ID; data report from mobiles 304; and data report from equipment/elements 604.

Accordingly, embodiments describing interface design provide for a flexible and open interaction among DAM service providers to support an integrated DAM service including both joint and/or independent services.

Embodiments described herein provide for DAM function decoupling and DAM service consortium. Embodiments described herein further provide for DAM service architecture options. Embodiments described herein further provide for responsibility and actions of each DAM service player including: controlled data collection service providers, data de-privacy service providers, data AI service providers to provide data analysis results—information; and information data distribution service providers. Embodiments described herein further provide for an interface design to support the DAM service architecture.

Embodiments described herein provide for a DAM function decoupling approach and the distribution of the responsibility and ownership of DAM functions among multiple players. By providing DAM services through different players/providers, the risks associated with having one provider managing all DAM functions/services is reduced. Further, this approach provides for an enhancement to privacy protection, by avoiding having one provider controlling all aspects of DAM services, and thereby providing a better operation data protection.

Figure 7:
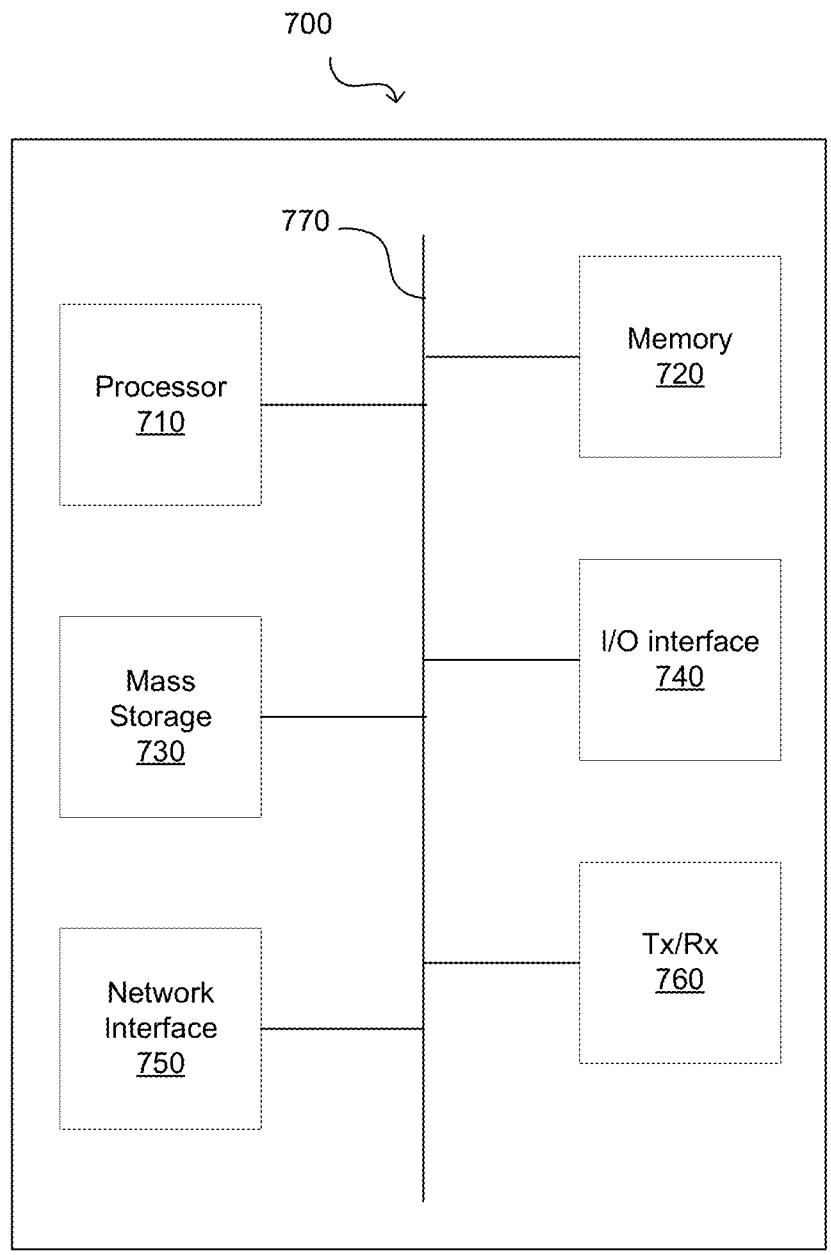
FIG. 7 is a schematic diagram of an electronic device that may perform any or all of operations of the methods and features explicitly or implicitly described herein, according to different embodiments of the present invention.

FIG. 7 is a schematic diagram of an electronic device that may perform any or all of operations of the methods and features explicitly or implicitly described herein, according to different embodiments of the present invention. For example, a computer equipped with network function may be configured as electronic device 700.

As shown, the device includes a processor 710, such as a Central Processing Unit (CPU) or specialized processors such as a Graphics Processing Unit (GPU) or other such processor unit, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the method operations described herein.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

In accordance with embodiments of the present invention, there is provided a system and a method thereof. The system includes a first network function for collecting and storing collected data. The system further includes a second network function for removing private information from collected data to produce and supply privatized data for analysis. In some embodiments, the first function and the second network functions are separately controlled. The separately controlled feature of such a system enhances privacy of operation data by ensuring different entities control the collection of the operation data and the privatization of the collection data. Accordingly, in some embodiments, the second network function is operated by a second provider, the second provider being different from a first provider of the first network function. Having a first provider controlling the collection of operation data, and a second and different provider than the first provider to control the privatization data, allows for enhanced privacy, as this system avoids having one provider performing both the collection and the privatization of data. To further enhance the operation data privacy, in some embodiments, the second provider is a trusted source of privatized data. In some embodiments, the system further includes a third network function for receiving and analyzing the privatized data. In some embodiments, each of the first, second and third network functions are separately controlled. In some embodiments, each of the first, second and third networks function are operated by a different provider, the third network function being operated by a third provider. As discussed, the separately controlled feature of such a system further enhances privacy of operation data by ensuring a third entity, different form the second and first entity, controlling the analysing the privatized data. In some embodiments, the system of further includes a fourth network function for receiving analyzed data from the third network function and distributing the analysed data to requesters. In some embodiments, the first, second, third and fourth network functions are separately controlled. In some embodiments, each of the first, second, third and fourth network functions are operated by different providers, the fourth network function being operated by a fourth provider. Accordingly, having a different and a separate provider operating and controlling the different data operations, including the collection, the privatization, and distribution of data, provides for a more secured system for enhancing privacy of operation data. A method corresponding to the system may include actions performed by the network functions in the system. An apparatus including means for perform the method is also provided.

Another aspect of the disclosure provides for a system. The system includes a first network function for collecting and storing collected data. The system further includes a second network function for removing private information from collected data to produce and supply de-privatized data for analysis. In some embodiments, the first and second network functions are separately controlled. In some embodiments, the second network function is operated by a second provider, the second provider being different from a first provider of the first network function. In some embodiments, the second provider is a trusted source of de-privatized data. In some embodiments, the system further includes a third network function for receiving and analyzing the de-privatized data. In some embodiments, each of the first, second and third network functions are separately controlled. In some embodiments, each of the first, second and third networks functions are operated by a different provider, the third network function being operated by a third provider. In some embodiments, the system further includes a fourth network function for receiving analyzed data from the third network function and distributing the analyzed data to requesters. In some embodiments, each of the first, second, third and fourth network functions are separately controlled. In some embodiments, each of the first, second, third and fourth network functions are operated by different providers, the fourth network function being operated by a fourth provider. In some embodiments, the third network function utilizes artificial intelligence in providing data analyzing the de-privatized data. In some embodiments, the system further includes a first interface for communicating control messages between the first provider and the second provider. In some embodiments, the first provider sends, using the first interface, an indication of data availability message to the second provider, the indication of data availability message including one or more of: a service customer type identifier (ID), a service type (ID), a slice ID and database access information. In some embodiments, the system further includes a second interface for communicating control messages between the second provider and the third provider. In some embodiments, the second provider sends, using the second interface, an indication of data availability message to the third provider, the indication of data availability message including one or more of: a service customer type identifier (ID), a service type (ID), a slice ID and database access information. In some embodiments, the system further includes a third interface for communicating a control messages between the first provider and the third provider. In some embodiments, the third provider sends, using the third interface, a data collection request message to the first provider, the data collection request message including one or more of: a start time, a stop time and a data amount. In some embodiments, the system further includes a fourth interface for communicating control messages between the third provider and the fourth provider. In some embodiments, the third provider sends, using the fourth interface, an indication of data availability message to the fourth provider, the indication of data availability message including one or more of: a service customer type identifier (ID), a service type (ID), a slice ID and database access information. In some embodiments, the system further includes a fifth interface for receiving a request from one of the requestors. In some embodiments, the request includes from one or more of a service customer type identifier (ID); a service type (ID); for each service type ID, one or more of: an artificial intelligence service performance requirement ID, a de-privacy service performance requirement ID, an equipment ID and corresponding physical location. In some embodiments, the system further includes a sixth interface between the first provider and at least one data source. In some embodiments, the at least one data source includes a mobile, an infrastructure equipment, and a database. In some embodiments, the first provider sends, using the sixth interfaces, sends a data collection request message to the at least one data source, the data collection request message including one or more of: a collection action identifier (ID), a data type, and a collection frequency. In some embodiments, the data source sends a data collection response message to the first provider, the data collection response message including one or more of: collection action ID, data report from the data source.

Another aspect of the disclosure providers for a system for providing an artificial intelligence (AI) service for analyzing. The system includes a set of network elements configured in an AI slice for receiving data for analysis and providing analyzed data. The system further includes a data distribution network slice for receiving and distributing the analyzed data from the AI configured network function to requesters. In some embodiments, the set of network elements receives de-privatized data from a trusted source. In some embodiments, the system further includes a first interface between the set of network elements and the data distribution network slice. In some embodiments, the set of network elements sends, using the first interface, an indication of data availability message to the fourth provider, the indication of data availability message including one or more of: a service customer type identifier (ID), a service type (ID), a slice ID and database access information. In some embodiments, the system further includes a second interface between the set of network elements and the trusted source. In some embodiments, the trusted source sends, using the second interface, an indication of data availability message to the set of network elements, the indication of data availability message including one or more of: a service customer type identifier (ID), a service type (ID), a slice ID and database access information. In some embodiments, the system further includes a third interface for receiving a request from a requestor. In some embodiments, the request includes from one or more of: a service customer type identifier (ID); a service type (ID); an equipment ID and corresponding physical location; and for each service type ID, one or more of: an artificial intelligence service performance requirement ID, and a de-privacy service performance requirement ID.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system comprising:
a first network element including a first processor and a first machine-readable medium storing executable instructions which when executed by the first processor configure the first network element to implement a first network function; and
a second network element including a second processor and a second machine-readable medium storing executable instructions which when executed by the second processor configure the second network element to implement a second network function;

a third network element including a third processor and a third machine-readable medium storing executable instructions which when executed by the third processor configure the third network element to implement a third network function;

a fourth network element including a fourth processor and a fourth machine-readable medium storing executable instructions which when executed by the fourth processor configure the fourth network element to implement a fourth network function;

the first network function is configured to: receive from a customer a request for a service, collect data according to the request and send the collected data to the second network function;

the second network function is configured to: receive the collected data from the first network function, remove private information from the collected data to produce privatized data and send the privatized data to the third network function;

the third network function is configured to: receive the privatized data from the second network function, analyze the privatized data to produce analyzed data and send the analyzed data to the fourth network function; and the fourth network function is configured to: receive the analyzed data from the third network function and distribute the analyzed data to one or more data requesters;

wherein each of the first, the second, the third, and the fourth network functions is separately controlled, and wherein none of the first, the second, the third, and the fourth network functions having full access to the collected data, the privatized data, and the analyzed data.

2. The system of claim 1,
wherein the first network function is operated by a first provider via a first controller, the second network function is operated by a second provider via a second controller, the third network function is operated by a third provider via a third controller, and the fourth network function is operated by a fourth provider via a fourth controller; and
wherein the second provider being a trusted provider and different from the first provider.

3. The system of claim 2, wherein each of the first, the second, the third and the fourth network function is operated by a different provider.

4. The system of claim 3 further comprising a first interface for communicating control messages between the first controller and the second controller,
wherein the first provider sends, using the first interface, an indication of a data availability message to the second provider, the indication of the data availability message comprising one or more of: a service customer type identifier (ID), a service type ID, a slice ID and database access information.

5. The system of claim 3 further comprising a second interface for communicating control messages between the second controller and the third controller, wherein the second provider sends, using the second interface, an indication of a data availability message to the third provider, the indication of the data availability message comprising one or more of: a service customer type identifier (ID), a service type ID, a slice ID and database access information.

6. The system of claim 3 further comprising a third interface for communicating control messages between the first controller and the third controller,
wherein the third provider sends, using the third interface, a data collection request message to the first provider, the data collection request message comprising one or more of: a start time, a stop time and a data amount.

7. The system of claim 3 further comprising a fourth interface for communicating control messages between the third controller and the fourth controller,
wherein the third provider sends, using the fourth interface, an indication of a data availability message to the fourth provider, the indication of the data availability message comprising one or more of: a service customer type identifier (ID), a service type ID, a slice ID and database access information.

8. The system of claim 2 further comprising an interface between the first controller and at least one data source,
wherein the first provider sends, using the interface, a data collection request message to the at least one data source, the data collection request message comprising one or more of: a collection action identifier (ID), a data type, and a collection frequency.

9. The system of claim 8, wherein the at least one data source includes a mobile device, an infrastructure equipment, or a database.

10. The system of claim 8, wherein the at least one data source sends a data collection response message to the first provider, the data collection response message comprising one or more of: collection action ID and a data report.

11. The system of claim 1, wherein
analyzing the privatized data to produce the analyzed data comprising performing artificial intelligence operations on the privatized data.

12. The system of claim 1 further comprising an interface for receiving the request for the service from the one or more data requesters, the request comprising one or more of:
a service customer type identifier (ID);
a service type ID;
for each service type ID, one or more of:
an artificial intelligence service performance requirement ID;
a privacy service performance requirement ID;
an equipment ID and a corresponding physical location.

13. A system comprising
a first network element including a first processor and a first machine-readable medium storing executable instructions which when executed by the first processor configure the first network element to implement a first network function, the first network function configured for:
receiving from a customer a request for a service;
collecting data according to the request; and
sending the collected data to the second network function;
a second network element including a second processor and a second machine-readable medium storing executable instructions which when executed by the second processor configure the second network element to implement a second network function, the second network function configured for:
receiving the collected data from the first network function,
removing private information from the collected data to produce privatized data; and
sending the privatized data to the third network function;
a third network element including a third processor and a third machine-readable medium storing executable instructions which when executed by the third processor configure the third network element to implement a third network function, the third network function configured for:

receiving, from a the second network function, privatized data, the privatized data being free of identification information;

analyzing the privatized data and generating analyzed data; and sending the analyzed data to a fourth network function; and a fourth network element including a fourth processor and a fourth machine-readable medium storing executable instructions which when executed by the fourth processor configure the fourth network element to implement the fourth network function, the fourth network function configured for:

receiving the analyzed data from the third network function; and distributing the analyzed data to one or more data requesters;

wherein the first, the second, the third and the fourth network functions are separately controlled by a first provider, a second provider, a third provider and a fourth provider respectively to facilitate decoupling and distributed ownership between the first provider, the second provider, the third provider and the fourth provider, and wherein the first provider represents a first network entity, the second provider represents a second network entity, the third provider represents a third network entity, and the fourth provider represents a fourth network entity.

14. The system of claim 13, wherein;

the third network function is operated by the third provider via a third controller and the fourth network function is operated by the fourth provider via a fourth controller; and the third provider and the fourth provider are different.

15. The system of claim 14 further comprising a first interface for communicating control messages between the third controller and the fourth controller, wherein the third provider sends, using the first interface, an indication of data availability message to the fourth provider, the indication of data availability message comprising one or more of: a service customer type identifier (ID), a service type ID, a slice ID and database access information.

16. The system of claim 15 further comprising a second interface between the third controller and a controller of the second network function, wherein the second network function sends, using the second interface, an indication of data availability message to the third provider, the indication of data availability message comprising one or more of: a service customer type ID, a service type ID, a slice ID and database access information.

17. The system of claim 16 further comprising a third interface for receiving a request for an AI service from the one or more data requesters, the request comprising one or more of: a service customer type ID, a service type ID, and for each service type ID an artificial intelligence service performance requirement ID.

18. A method comprising:

collecting, by a first network function, data according to a request for a service;

storing, by the first network function, the collected data;

receiving, by a second network function, the collected data;

removing, by the second network function and according to the request, private information from the collected data to produce privatized data;

receiving, by a third network function, the privatized data;

analyzing, by the third network function, the privatized data to produce analyzed data, wherein analyzing the privatized data comprises performing artificial intelligence (AI) operations according to the request;

receiving, by a fourth network function, the analyzed data; and distributing, by the fourth network function, the analyzed data, wherein each of the first, the second, the third and the fourth network functions is operated via a different controller, and wherein none of the first, the second, the third, and the fourth network functions having full access to the collected data, the privatized data, and the analyzed data.

* * * * *